(12) United States Patent
Hoke et al.

(10) Patent No.: US 8,443,610 B2
(45) Date of Patent: May 21, 2013

(54) LOW EMISSION GAS TURBINE COMBUSTOR

(75) Inventors: James B. Hoke, Tolland, CT (US); Albert K. Cheung, East Hampton, CT (US); William A. Sowa, Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 721 days.

(21) Appl. No.: 12/625,750

(22) Filed: Nov. 25, 2009

(65) Prior Publication Data
US 2011/0120134 A1 May 26, 2011

(51) Int. Cl.
*F23R 3/04* (2006.01)
*F23R 3/002* (2006.01)

(52) U.S. Cl.
USPC .............................. 60/752; 60/732

(58) Field of Classification Search
USPC ................ 60/732, 733, 754, 752, 755–757
See application file for complete search history.

(56) References Cited

U.S. PATENT DOCUMENTS

| | | | |
|---|---|---|---|
| 5,142,858 A * | 9/1992 | Ciokajlo et al. | 60/733 |
| 5,373,694 A * | 12/1994 | Clark | 60/804 |
| 5,435,139 A | 7/1995 | Pidcock et al. | |
| 5,628,192 A | 5/1997 | Hayes-Bradley et al. | |
| 5,640,851 A | 6/1997 | Toon et al. | |
| 5,758,503 A | 6/1998 | DuBell et al. | |
| 5,782,294 A | 7/1998 | Froemming et al. | |
| 5,797,267 A | 8/1998 | Richards | |
| 5,934,067 A | 8/1999 | Ansart et al. | |
| 5,983,642 A | 11/1999 | Parker et al. | |
| 6,047,539 A | 4/2000 | Farmer | |
| 6,070,412 A | 6/2000 | Ansart et al. | |
| 6,182,451 B1 | 2/2001 | Hadder | |
| 6,189,814 B1 | 2/2001 | Richards | |
| 6,240,731 B1 | 6/2001 | Hoke et al. | |
| 6,279,323 B1 * | 8/2001 | Monty et al. | 60/752 |
| 6,378,286 B2 | 4/2002 | Vermes et al. | |
| 6,470,685 B2 | 10/2002 | Pidcock et al. | |
| 6,571,566 B1 | 6/2003 | Temple et al. | |
| 6,606,861 B2 | 8/2003 | Snyder | |
| 6,701,714 B2 | 3/2004 | Burd et al. | |
| 6,763,664 B2 | 7/2004 | Aoyama | |
| 6,810,673 B2 | 11/2004 | Snyder | |
| 7,093,439 B2 | 8/2006 | Pacheco-Tougas et al. | |
| 7,093,441 B2 * | 8/2006 | Burd et al. | 60/752 |
| 2002/0116929 A1 | 8/2002 | Snyder | |
| 2003/0061817 A1 | 4/2003 | Aoyama | |
| 2003/0101731 A1 | 6/2003 | Burd et al. | |
| 2003/0167771 A1 | 9/2003 | Hayashi et al. | |
| 2003/0213250 A1 | 11/2003 | Pacheco-Tougas et al. | |
| 2003/0233832 A1 | 12/2003 | Martling et al. | |

(Continued)

FOREIGN PATENT DOCUMENTS

WO WO-2008127437 A2 10/2008

*Primary Examiner* — William H Rodriguez
*Assistant Examiner* — Carlos A Rivera
(74) *Attorney, Agent, or Firm* — Miller, Matthias & Hull LLP

(57) ABSTRACT

An annular combustor for a gas turbine has a combustion chamber having an interior volume that, in longitudinal section, includes a forward volume, an intermediate volume and an aft volume. The forward volume represents from about 30% to about 40% of the combustor interior volume, the intermediate volume represents from about 10% to about 20% of the combustor interior volume, and the aft volume represents from about 40% to about 60% of the combustor interior volume.

23 Claims, 3 Drawing Sheets

U.S. PATENT DOCUMENTS

| | | |
|---|---|---|
| 2004/0006995 A1 | 1/2004 | Snyder |
| 2004/0226299 A1 | 11/2004 | Drnevich |
| 2004/0231333 A1 | 11/2004 | Tiemann |
| 2005/0022531 A1 | 2/2005 | Burd |
| 2005/0086940 A1 | 4/2005 | Coughlan et al. |
| 2005/0086944 A1 | 4/2005 | Cowan |
| 2007/0125093 A1* | 6/2007 | Burd et al. ............ 60/804 |

* cited by examiner

LOW EMISSION GAS TURBINE COMBUSTOR

FIELD OF THE INVENTION

This invention relates generally to gas turbine engines and, more particularly, to combustors for gas turbine engines.

BACKGROUND OF THE INVENTION

Gas turbine engines, such as those used to power modern commercial aircraft or in industrial applications, include a compressor for pressurizing a supply of air, a combustor for burning a hydrocarbon fuel in the presence of the pressurized air, and a turbine for extracting energy from the resultant combustion gases. Generally, the compressor, combustor and turbine are disposed about a central engine axis with the compressor disposed axially upstream of the combustor and the turbine disposed axially downstream of the combustor.

An exemplary combustor features an annular combustion chamber defined between a radially inboard liner and a radially outboard liner extending aft from a forward bulkhead. The radially outboard liner extends circumferentially about and is radially spaced from the inboard liner, with the combustion chamber extending fore to aft therebetween. Exemplary liners are double structured, having an inner heat shield and an outer shell. Arrays of circumferentially distributed combustion air holes penetrate the outboard liner and the inboard liner at one or more axial locations to admit combustion air into the combustion chamber along the length of the combustion chamber. A plurality of circumferentially distributed fuel injectors and associated swirlers or air passages is mounted in the forward bulkhead. The fuel injectors project into the forward end of the combustion chamber to supply the fuel. The swirlers impart a swirl to inlet air entering the forward end of the combustion chamber at the bulkhead to provide rapid mixing of the fuel and inlet air. Commonly assigned U.S. Pat. Nos. 7,093,441; 6,606,861 and 6,810,673, the entire disclosures of which are hereby incorporated herein by reference as if set forth herein, disclose exemplary prior art annular combustors for gas turbine engines.

Combustion of the hydrocarbon fuel in air inevitably produces oxides of nitrogen (NOx). NOx emissions are the subject of increasingly stringent controls by regulatory authorities. One combustion strategy for minimizing NOx emissions from gas turbine engines is referred to as rich burn, quick quench, lean burn (RQL) combustion. The RQL combustion strategy recognizes that the conditions for NOx formation are most favorable at elevated combustion flame temperatures, i.e. when the fuel-air ratio is at or near stoichiometric. In a combustor configured for RQL combustion, the combustion process, at least during operation at or near full power, includes three serially arranged combustion zones: a fuel-rich combustion zone at the forward end of the combustor, a quench or dilution zone that involves the transition from fuel-rich combustion to fuel-lean combustion via the addition of combustion air, and a lean combustion zone axially aft of the quench or dilution zone. Thus, the combustion process in a combustor configured for RQL combustion has two governing states of combustion: a first state in the forward portion of the combustor that is stoichiometrically fuel-rich and a second state in a downstream portion of the combustor that is stoichiometrically fuel-lean.

SUMMARY OF THE INVENTION

An annular combustor for a gas turbine engine includes an inboard liner extending longitudinally fore-to-aft and having a forward section and an aft section, an outboard liner spaced radially outboard of and generally coaxially circumscribing the inboard liner and having a forward section and an aft section, and a bulkhead extending between a forward end of the inboard liner and a forward end of the outboard liner and cooperating therewith to define a combustor interior volume extending fore to aft from the bulkhead to an annular combustor exit extending between the aft end of the inboard liner and the aft end of the outboard liner. A plurality of combustion air admission holes are formed in each of the inboard liner and the outboard liner. In each of the inner and outboard liners, the plurality of combustion air admission holes are arranged with the respective centers of the plurality of combustion air admission holes disposed in a circumferential row. In longitudinal section, the combustor interior volume includes a forward volume extending fore to aft from the bulkhead to an annular boundary extending between the aft end of the forward section of the inboard liner and the aft end of the forward section of the outboard liner, an aft volume extending fore to aft from an annular boundary extending between the centers of the row combustion air admission holes in the inboard liner and the centers of the row of combustion air admission holes in the outboard liner and the annular combustor exit, and an intermediate volume extending fore to aft from a forward end interfacing with an aft end of the forward volume to an aft end interfacing with a forward end of the aft volume. The forward volume represents from about 30% to about 40% of the combustor interior volume, the intermediate volume represents from about 10% to about 20% of the combustor interior volume, and the aft volume represents from about 40% to about 60% of the combustor interior volume. In an embodiment, the forward volume represents about 35% of the combustor interior volume, the intermediate volume represents about 20% of the combustor interior volume, and the aft volume represents about 45% of the combustor interior volume.

In an embodiment, the forward section of the inboard liner and the forward section of the outboard liner converge from fore to aft. The forward section of the inboard liner converges toward the forward section of the outboard liner at an included interior angle in the range of from 70 degrees to 85 degrees and the forward section of the outboard liner converges toward the forward section of the inboard liner at an included interior angle in the range of from 70 degrees to 85 degrees. In an embodiment, the forward section of the inboard liner converges toward the forward section of the outboard liner at an included interior angle in the range of from 74 degrees to 78 degrees. In an embodiment, the forward section of the outboard liner converges toward the forward section of the inboard liner at an included interior angle in the range of from 74 degrees to 78 degrees.

In an embodiment, the aft section of the inboard liner extends aftwardly from the aft end of the forward section of the inboard liner at an angle in the range of from 180 degrees to 200 degrees and the aft section of the outboard liner extends aftwardly from the aft end of the forward section of the outboard liner at an angle in the range of from 180 degrees to 200 degrees. In an embodiment, the aft section of the inboard liner extends aftwardly from the aft end of the forward section of the inboard liner at an angle in the range of from 188 degrees to 192 degrees. In an embodiment, the aft section of the outboard liner extends aftwardly from the aft end of the forward section of the outboard liner at an angle in the range of from 190 degrees to 196 degrees.

The annular combustor includes a plurality of fuel injectors mounted in the bulkhead, the fuel injectors disposed in a circumferential array at equally spaced circumferential intervals, S, center-to-center. In an embodiment, the fuel injectors may be spaced such that a ratio S/D has a value in the range of at least 1.1 to not greater than 1.30, D being the annular depth in a radial direction of the combustor interior volume between the inboard liner and the outboard liner at the interface of the intermediate volume with the aft volume. In an embodiment, the fuel injectors may be spaced such that the ratio S/D has a value in the range of 1.25 to 1.30. In an embodiment, the fuel injectors may also be spaced such that the ratio S/H has a value in the range of at least 0.9 to less than 0.95, H being the annular height in a radial direction of the bulkhead extending between the forward end of the inboard liner and the forward end of the outboard liner.

BRIEF DESCRIPTION OF THE DRAWINGS

For a further understanding of the disclosure, reference will be made to the following detailed description which is to be read in connection with the accompanying drawing, wherein.

DETAILED DESCRIPTION OF THE INVENTION

Figure 1:
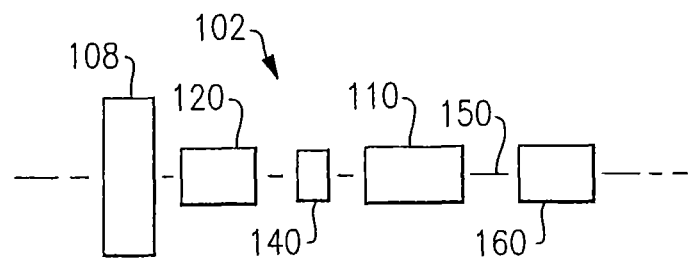
FIG. 1 is a schematic representation of a gas turbine engine.

Referring to FIG. 1, there is depicted schematically a conventional gas turbine engine 102 including a combustor module 110, a compressor 120 disposed forward, that is upstream with respect to flow, of the combustor module 110, a diffuser 140 extending from the outlet of the compressor to the forward end of the combustor module 110, and a turbine module 160 disposed aft, that is downstream with respect to flow, of the combustor module 110. The compressor, combustion module and turbine module are generally coaxially disposed about a central axis 150 of the engine shaft which constitutes the centerline of the gas turbine engine. For a turbofan gas turbine engine, a large diameter fan 108 is mounted to the engine shaft forward of the compressor 120. Most large commercial jet liners of contemporary design use the turbofan version of the gas turbine engine to power the aircraft. It should be noted that small engines may have radial or centrifugal compressors, rather than axial compressors. Further, it is to be understood that the invention described herein is also applicable to combustors used in gas turbine jet engines that are not turbofan engines, as well as to the combustors of industrial gas turbine engines.

Figure 4:
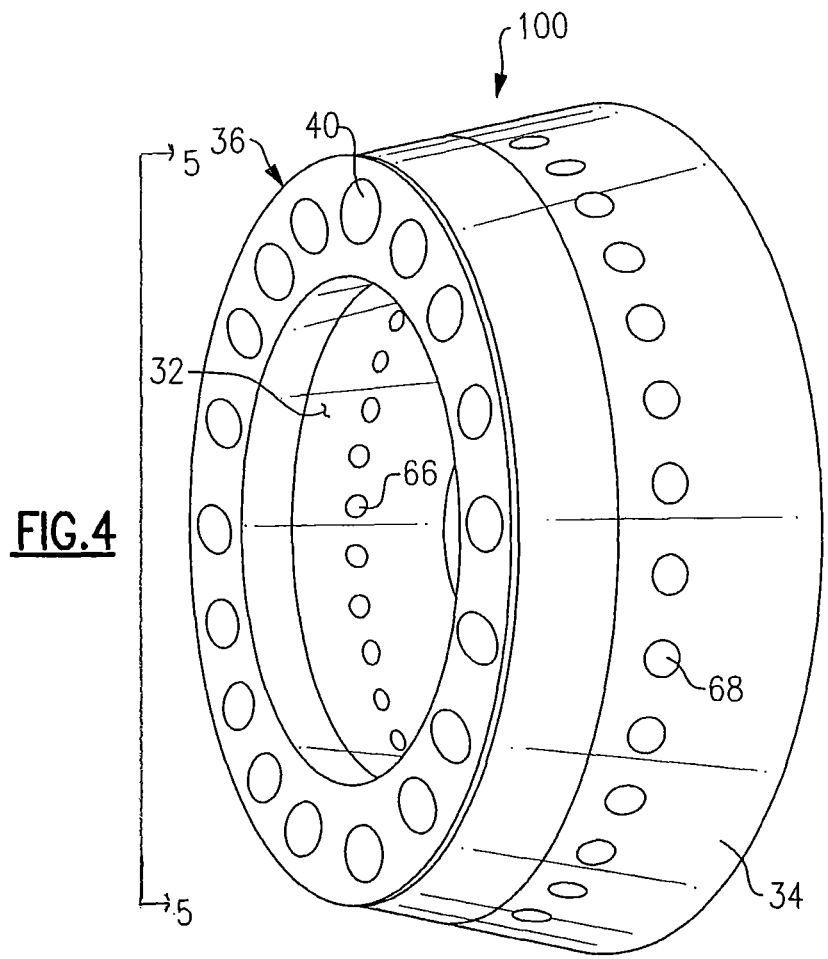
FIG. 4 is a perspective view showing an annular combustor according to the invention.
Figure 2:
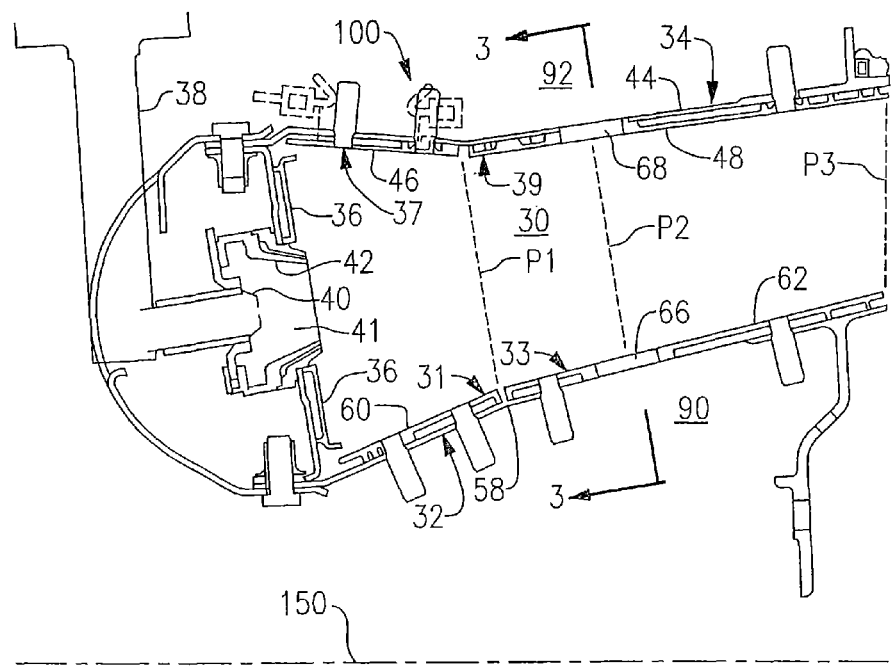
FIG. 2 is a sectioned side elevation view of an annular combustor according to the present invention.
Figure 3:
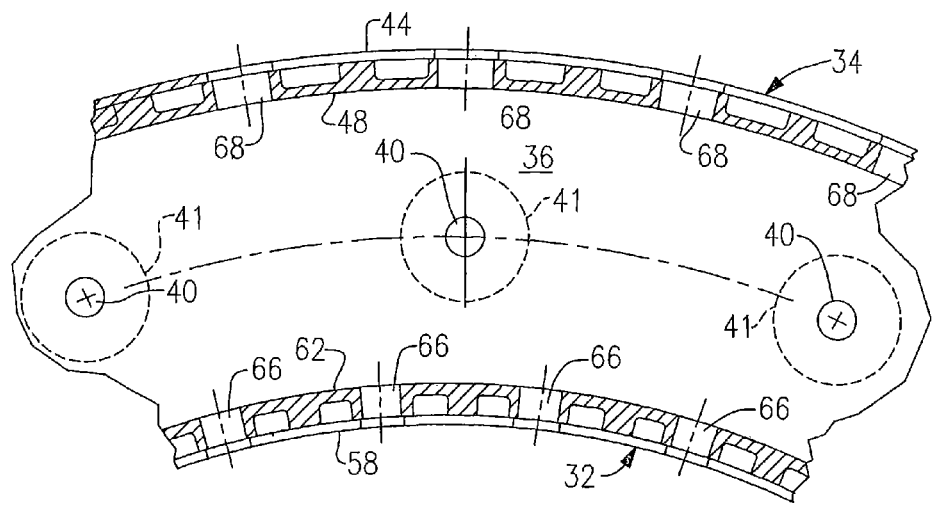
FIG. 3 is a sectioned elevation view taken substantially along line 3-3 of FIG. 2.

Referring now to FIGS. 2-4, the exemplary combustor module includes an annular combustor 100 which is disposed concentric with the engine axis 150 in an annular pressure vessel (not shown) defined by a radially inner case (not shown) and a radially outer case (not shown). The annular combustor includes a radially inboard liner 32, a radially outboard liner 34 that circumscribes the inboard liner 32, and a forward bulkhead 36. The inboard liner 32 has a forward section 31 and an aft section 33 and extends longitudinally fore-to-aft from a forward end of the forward section 31 to an aft end of the aft section 33. Similarly, the outboard liner 34 has a forward section 37 and an aft section 39 and extends longitudinally fore-to-aft from a forward end of the forward section 37 to an aft end of the aft section 39. The bulkhead 36 extends between the respective forward end of the forward section 31 of the inboard liner 32 and the forward end of the forward section 37 of the outboard liner 34. Collectively, the inboard liner 32, the outboard liner 34 and the forward bulkhead 36 bound the annular combustion chamber 30 and define a combustor interior volume that extends longitudinally within the annulus formed by the inboard liner 32 and the outboard liner 34 from the bulkhead 36 to an annular combustor exit extending between the respective aft ends of the respective aft sections, 33, 39 of the inner and outboard liners 32, 34.

Referring now also to FIG. 3 in particular, the forward bulkhead 36 carries a plurality of fuel injectors 40, for example typically from 12 to 24 depending upon the size of the engine, disposed in a circumferential array at spaced intervals about the annular combustion chamber 30. Each fuel nozzle 40 is disposed at the end of a fuel injector 38 which extends through the outer case (not shown) to convey fuel from an external source to the associated fuel nozzle. Each fuel nozzle 40 injects fuel through a spray head into a central stream of air emitted along the centerline of the fuel nozzle. An air passage 41, which may have a swirler 42 associated therewith as depicted in the exemplary embodiment, is operatively associated with each fuel nozzle 40. In operation, pressurized air from the compressor is decelerated as it passes through the diffuser and is directed into the annular plenums 90, 92 defined within the annular pressure vessel (not shown), the annular plenum 90 extending circumferentially along and radially inwardly of the inboard liner 32 and the annular plenum 92 extending circumferentially about and radially outwardly of the outboard liner 34. A portion of this pressured air passes into the combustion chamber 30 through the air passages 41. Each swirler 42 imparts a spin to the air passing therethrough to provide rapid mixing of this air with the fuel being injected through the associated fuel nozzle 40 to promote initial combustion of the fuel in a fuel-rich state in a forward portion of the combustion chamber 30.

In the exemplary embodiment, the inboard liner 32 and the outboard liner 34 are each of a double-wall construction. More specifically, the inboard liner 32 and the outboard liner 34 are each structured with a support shell and associated forward and aft heat shields secured, respectively, to forward and aft portions of the support shell. The inboard liner 32 includes a single piece inner support shell 58, a forward heat shield 60 secured by fasteners (not shown) to the forward portion of the support shell 58 and an aft heat shield 62 secured by fasteners (not shown) to the aft portion of the support shell 58. Similarly, the outboard liner 34 includes a single piece outer support shell 44, a forward heat shield 46 secured by fasteners (not shown) to the forward portion of the support shell 44, and an aft heat shield 48 secured by fasteners (not shown) to the aft portion of the support shell 44. The heat shields may be formed as a circumferential array of panels, each panel having a longitudinal expanse in the axial direction and a lateral expanse in the circumferential direction. Each heat shield panel has a longitudinal expanse in the axial direction, a lateral expanse in the circumferential direction, and a surface that faces the hot combustion products within the combustion chamber 30. Exemplary liner and heat shield constructions are described and shown in commonly assigned U.S. Pat. No. 7,093,439, the entire disclosure of which is hereby incorporated herein by reference as if set forth herein.

Other embodiments, including single-wall liners, are still within the spirit and scope of the invention.

As previously noted, a portion of this pressurized air enters the forward region of the combustion chamber 30 through the fuel injectors 40 and by way of the air passages 41 associated the fuel injectors 40. Additional air enters the forward region of the combustion chamber 30 by way of cooling holes (not shown) in the forward bulkhead 36 as bulkhead cooling air. Collectively, these portions of air admitted at the forward end of the combustion chamber are referred to as primary combustion air contributors because it intermixes to a great extent with fuel introduced through the fuel injectors 40 to support initial combustion in a fuel-rich state in the forward section of the combustion chamber. Another portion of pressurized air from the annular plenums 90, 92 enters the combustion chamber 30 through a plurality of combustion air admission holes 66, 68 as combustion air for the purpose of contributing to the combustion process, diluting the combustion products and reducing hot spots within the combustion products to provide a desired spatial temperature profile across the combustion products before entering the turbine module 16.

The combustion air admission holes 66, 68 are formed in the aft heat shields of the inner and outboard liners 32, 34, respectively. Each of the combustion air admission holes 66 in the inboard liner 32 is formed by corresponding aligned holes formed in the aft portion of the support shell 58 and the associated aft heat shield 62. The plurality of combustion air admission holes 66 in the inboard liner 32 are arranged in spaced relationship with the respective centers of the plurality of combustion air admission holes 66 disposed in a circumferential row. Similarly, each of the combustion air admission holes 68 in the outboard liner 34 is formed by corresponding aligned holes formed in the aft portion of the support shell 44 and the associated aft heat shield 48. The plurality of combustion air admission holes 68 in the outboard liner 34 are also arranged in spaced relationship with the respective centers of the plurality of combustion air admission holes 68 disposed in a circumferential row. In the exemplary embodiment of the combustor 100 depicted in the drawings, a single row of uniformly sized combustion air admission holes 66, 68 are provided in the inner and outer liners 32, 34, respectively. However, other arrangements of combustion air admission holes may be used, for example a single row of alternating relatively larger and relatively smaller combustion air admission holes may be provided in either or both of the inner and outer liners 32, 34.

Figure 5:
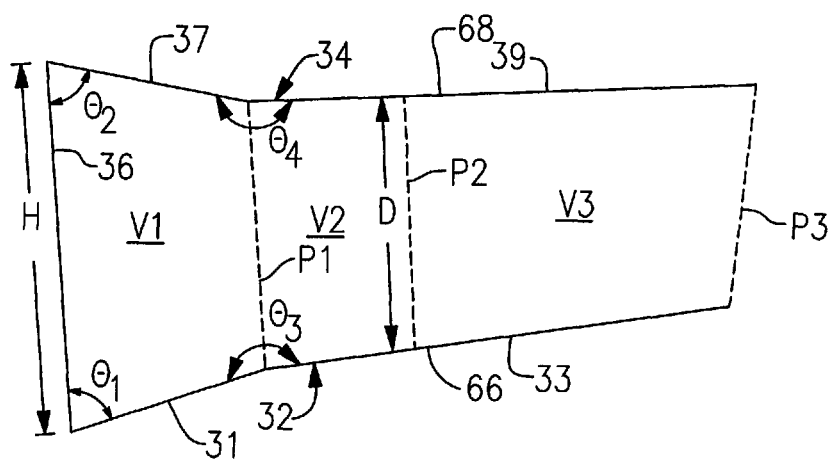
FIG. 5 is a simplified line drawing of the side elevation view of the annular combustor of FIG. 2 illustrating certain dimensional and angular relationships.

Referring now to FIG. 5 in particular, in longitudinal section, the interior volume of the combustion chamber 30 consists of a forward volume, V1, an intermediate volume, V2, and an aft volume, V3. The forward volume, V1, extends longitudinally fore to aft from the bulkhead 36 to an annular boundary, P1, extending between the aft end of the forward section of the inboard liner 32 and the aft end of the forward section of the outboard liner 34 The aft volume, V3, extends longitudinally fore to aft from an annular boundary, P2, extending between the centers of the row of combustion air admission holes 66 in the inboard liner 32 and the centers of the row of combustion air admission holes 68 in the outboard liner 34 and the annular combustor exit boundary, P3. The intermediate volume, V2, extends longitudinally fore to aft from a forward end interfacing with an aft end of the forward volume, V1, to an aft end interfacing with a forward end of the aft volume, V3.

In the annular combustor 100 described herein, the forward volume, V1, represents from about 30% to about 40% of the combustor interior volume, the intermediate volume, V2, represents from about 10% to about 20% of the combustor interior volume, and the aft volume, V3, represents from about 40% to about 60% of the combustor interior volume. In an embodiment of the annular combustor 100, the forward volume, V1, represents about 35% of the combustor interior volume, the intermediate volume, V2, represents about 20% of the combustor interior volume, and the aft volume, V3, represents about 45% of the combustor interior volume.

In the exemplary embodiment of the annular combustor 100 described herein, the combustion chamber 30 has a forward portion wherein the inboard liner 32 and outboard liner 34 converge from fore to aft and an aft portion wherein the inboard inner 32 and outboard liner 34 converge fore to aft more gradually in comparison to the forward portion, such as depicted in FIGS. 2 and 5, or extend in parallel relationship. The converging forward portion of the combustion chamber 30 is bounded by and is coextensive with the forward section 31 of the inboard liner 32 and the forward section 37 of the outboard liner 34. Therefore, the converging forward portion of the combustion chamber 30 is commensurate with and encompasses the forward volume, V1, of the combustor interior volume. The aft portion of the combustion chamber 30 is bounded by and is coextensive with the aft section 33 of the inboard liner 32 and the aft section 39 of the outboard liner 34. Thus, the aft portion of the combustion chamber 30 is commensurate with and encompasses both the intermediate volume, V2, and the aft volume, V3.

For example, in an embodiment of the annular combustor 100, the forward section 31 of the inboard liner 32 converges inwardly toward the forward section 37 of the outboard liner 34 at an interior angle, $\theta_1$, with the bulkhead 36 in the range of from 70 degrees to 85 degrees and the forward section 37 of the outboard liner 34 also converges inwardly toward the forward section 31 of the inboard liner 32 at an interior angle, $\theta_2$, with the bulkhead 36 in the range of from 70 degrees to 85 degrees. In an embodiment, the forward section 31 of the inboard liner 32 converges toward the forward section 37 of the outboard liner 34 at an interior angle, $\theta_1$, with the bulkhead 36 in the range of from 74 degrees to 78 degrees. In an embodiment, the forward section 37 of the outboard liner 34 converges toward the forward section 31 of the inboard liner 32 at an interior angle, $\theta_2$, with the bulkhead 36 in the range of from 74 degrees to 78 degrees.

In an embodiment of the annular combustor 100, the aft section 33 of the inboard liner 32 extends aftwardly from the aft end of the forward section 31 of the inboard liner 32 at an angle, $\theta_3$, in the range of from 180 degrees to 200 degrees and the aft section 39 of the outboard liner 34 extends aftwardly from the aft end of the forward section 37 of the outboard liner 34 at an angle, $\theta_4$, in the range of from 180 degrees to 200 degrees. In an embodiment of the annular combustor 100, the aft section 33 of the inboard liner 32 extends aftwardly from the aft end of the forward section 31 of the inboard liner 32 at an angle, $\theta_3$, in the range of from 188 degrees to 192 degrees. In an embodiment of the annular combustor 100, the aft section 39 of the outboard liner 34 extends aftwardly from the aft end of the forward section 37 of the outboard liner 34 at an angle, $\theta_4$, in the range of from 190 degrees to 196 degrees.

Figure 6:
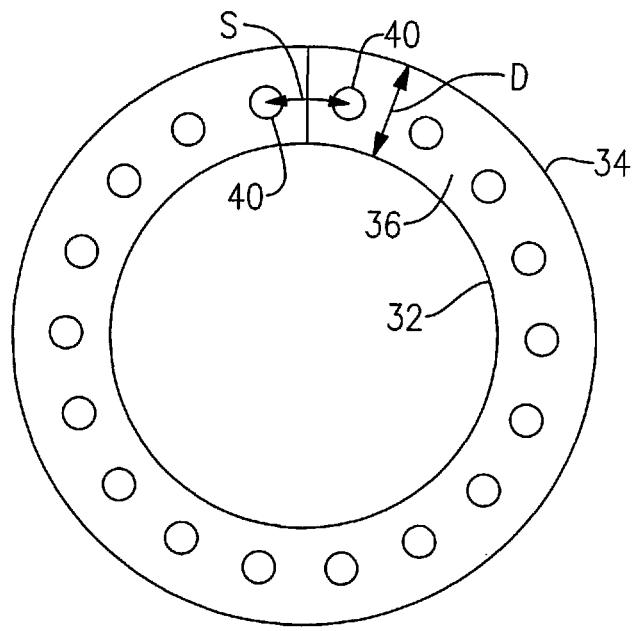
FIG. 6 is a simplified line drawing of an elevation view of the combustor shown in FIG. 4 taken substantially in the direction of line 5-5.

As noted previously, the annular combustor 100 includes a plurality of fuel injectors 40 mounted in the bulkhead 36. The fuel injectors 40 are disposed in a circumferential array at equally spaced circumferential intervals, S, around the bulkhead 36 as illustrated in FIG. 6. In an embodiment of the annular combustor 100, the fuel injectors 40 may be spaced such that a ratio S/D has a value in the range of at least 1.1 to not greater than 1.30, wherein D is the annular depth in a radial direction of the combustor interior volume between the inboard liner 32 and the outboard liner 34 at the interface of the intermediate volume, V2, with the aft volume, V3. The interface of the intermediate volume, V2, with the aft volume, V3, is coincident with the annular boundary, $P_2$, extending between the centers of the row of combustion air admission holes 66 in the inboard liner 32 and the centers of the row of combustion air admission holes 68 in the outboard liner 34. In an embodiment, the fuel injectors 40 may be spaced apart such that the ratio S/D has a value in the range of 1.25 to 1.30. In an embodiment, the fuel injectors may also be spaced apart such that the ratio S/H also has a value in the range of at least 0.9 to less than 0.95, H being the annular height in a radial direction of the bulkhead 36 extending between the forward end of the inboard liner 32 and the forward end of the outboard liner 34.

The annular combustor 100 described herein may be operated as a low $NO_X$ emission combustor via a combustion process commonly referred to as "rich burn-quick quench-lean burn" (RQL) combustion. In RQL combustion, the portion of the combustion air admitted to the combustion chamber as primary air is limited to an amount significantly less than the amount of air required for stoichiometric combustion of the fuel injected through the fuel injectors 40. Thus, combustion in the combustion chamber upstream of the admission of additional combustion air through the plurality of combustion air admission nozzles 66, 68, occurs, on average, under fuel rich conditions, although local variability in terms of stoichiometric combustion is likely. The overall fuel-rich stoichiometry of the fuel-air mixture in this rich burn zone produces a relatively cool flame, thus reducing excessive NOx formation and guarding against blowout of the combustion flame during any abrupt reduction in engine power or low-power operation.

The combustion products from this rich burn zone, which include unburned fuel, then enter a quench zone commensurate with the region of the combustion chamber 30 into which the additional combustion air is admitted through the aforementioned combustion air admission holes 66, 68 to penetrate radially inwardly into the combustion products to dilute and derich the combustion products from their stoichiometrically rich state proximate to the forward edge of the quench zone to a stoichiometrically fuel lean state proximate to the aft edge of the quench zone. The combustion process is substantially completed under fuel lean conditions in the lean zone that extends from the aft extent of the quench zone longitudinally aftward to the annular combustor exit.

Thus, when operating in an RQL combustion mode, at least under at or near full power operation, combustion within the forward volume, V1, of the interior volume of the combustion chamber 30 of the annular combustor 100 would be at a fuel-rich stoichiometry, while combustion within the aft volume, V3, would be primarily at a fuel-lean stoichiometry. In the intermediate volume, V2, of the interior volume of the combustion chamber 30 of the annular combustor 100, combustion would transition from a fuel-rich stoichiometry in the forward region of the intermediate volume to a fuel-lean stoichiometry at the aft end of the intermediate volume. It is to be understood that in any combustor operating in a RQL combustion mode, the interfaces between the fuel rich burn zone, the quick quench zone and the fuel lean burn zone are not sharply defined and will migrate in location axially as the operating conditions of the gas turbine engine vary, such as for example as the power level at which the gas turbine engine is operating changes.

The distribution of the combustor volume as disclosed herein establishes a combustion residence time profile that enables low NOx production without sacrificing combustion performance. The disclosed distribution provides adequate volume in the forward volume, V1, to provide sufficient residence time to ensuring good injection and flame stability, as well as combustion operability for the engine power operating range. The distribution of combustor volume in the aft section of the combustor between the intermediate volume, V2, and the aft volume, V3, ensures adequate quenching and mixing of additional combustion air with the partially combusted gases exiting the forward section of the combustor, thereby ensure low NOx emissions and a relatively uniform temperature profile in the gases exiting the combustion chamber 30. Additionally, the disclosed distribution of combustor volume permits the overall combustor volume to be reduced such that residence time is reduced by up to 60% when compared to prior art combustors without compromising operability or low emission performance. Residence time is defined as the time the total airflow takes to flow through the total combustor.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications may be made without departing from the spirit and scope of the invention. Those skilled in the art will also recognize the equivalents that may be substituted for elements described with reference to the exemplary embodiments disclosed herein without departing from the scope of the present invention.

Therefore, it is intended that the present disclosure not be limited to the particular embodiment(s) disclosed as, but that the disclosure will include all embodiments falling within the scope of the appended claims.

We claim:

1. An annular combustor for a gas turbine engine, comprising:

an inboard liner extending longitudinally fore to aft, the inboard liner having a forward section and an aft section;

an outboard liner spaced radially outboard of and circumscribing the inboard liner, the outboard liner having a forward section and an aft section;

a bulkhead extending between a forward end of the inboard liner and a forward end of the outboard liner and cooperating therewith to define a combustion interior volume extending fore to aft from the bulkhead to an annular combustor exit boundary extending between an aft end of the inboard liner and an aft end of the outboard liner;

a plurality of combustion air admission holes formed in the inboard liner, each air admission hole having a center, the plurality of combustion air admission holes arranged with the respective centers of the plurality of combustion air admission holes disposed in a circumferential row; and a plurality of combustion air admission holes formed in the outboard liner, each aid admission hole having a center, the plurality of combustion air admission holes arranged with the respective centers of the plurality of combustion air admission holes disposed in a circumferential row;

wherein, in longitudinal section, the combustor interior volume includes a forward volume extending fore to aft from the bulkhead to a first annular boundary extending between an aft end of the forward section of the inboard liner and an aft end of the forward section of the outboard liner, and aft volume extending fore to aft from a second annular boundary extending between the centers of the row of combustion air admission holes in the inboard liner and the centers of the row of combustion air admission holes in the outboard liner and the annular combustor exit boundary; and an intermediate volume extending fore to aft from a forward end interfacing with an aft end of the forward volume to an aft end interfacing with a forward end of the aft volume; the forward volume representing from about 30% to about 40% of the combustor interior volume; the intermediate volume representing from about 10% to about 20% of the combustor interior volume; and the aft volume representing from about 40% to about 60% of the combustor interior volume.

2. The annular combustor as recited in claim 1 wherein: the forward volume represents about 35% of the combustor interior volume; the intermediate volume represents about 20% of the combustor interior volume; and the aft volume represents about 45% of the combustor interior volume.

3. The annular combustor as recited in claim 1 wherein the forward section of the inboard liner and the forward section of the outboard liner converge from fore to aft.

4. The annular combustor as recited in claim 3 wherein:
the forward section of the inboard liner converges toward the forward section of the outboard liner at an included interior angle in the range of from 70 degrees to 85 degrees; and
the forward section of the outboard liner converges toward the forward section of the inboard liner at an included interior angle in the range of from 70 degrees to 85 degrees.

5. The annular combustor as recited in claim 4 wherein:
the forward section of the inboard liner converges toward the forward section of the outboard liner at an included interior angle in the range of from 74 degrees to 78 degrees.

6. The annular combustor as recited in claim 4 wherein:
the forward section of the outboard liner converges toward the forward section of the inboard liner at an included interior angle in the range of from 74 degrees to 78 degrees.

7. The annular combustor as recited in claim 3 wherein:
the aft section of the inboard liner extends aftwardly from the aft end of the forward section of the inboard liner at an angle in the range of from 180 degrees to 200 degrees; and
the aft section of the outboard liner extends aftwardly from the aft end of the forward section of the outboard liner at an angle in the range of from 180 degrees to 200 degrees.

8. The annular combustor as recited in claim 7 wherein:
the aft section of the inboard liner at an angle in the range of from 188 degrees to 192 degrees.

9. The annular combustor as recited in claim 7 wherein:
the aft section of the outboard liner extends aftwardly from the aft end of the forward section of the outboard liner at an angle in the range of from 190 degrees to 196 degrees.

10. The annular combustor as recited in claim 1 further comprising a plurality of fuel injectors mounted in the bulkhead, the fuel injectors disposed in a circumferential array at equally spaced circumferential intervals, S, wherein a ratio S/D has a value in the range of at least 1.1 to not greater than 1.30, D being the annular depth in a radial direction of the combustor interior volume between the inboard liner and the outboard liner at the interface of the intermediate volume with the aft volume.

11. The annular combustor as recited in claim 10 wherein the ratio S/D has a value in the range of 1.25 to 1.30.

12. The annular combustor as recited in claim 10 wherein the ratio S/H has a value in the range of at least 0.9 to less than 0.95, H being the annular height in a radial direction of the bulkhead extending between the forward end of the inboard liner and the forward end of the outboard liner.

13. The annular combustor as recited in claim 1 wherein the gas turbine engine comprises an aircraft gas turbine engine.

14. The annular combustor as recited in claim 1 wherein the gas turbine engine comprises an industrial gas turbine engine.

15. The annular combustor as recited in claim 1 wherein each of the inboard and the outboard liners comprise double-wall liners.

16. The annular combustor of claim 1 wherein each of the inboard and the outboard liners comprise single-wall liners.

17. A gas turbine combustor having a combustor interior volume comprising;
an inboard liner extending longitudinally fore to aft, the inboard liner having a forward section and an aft section, the aft section of the inboard liner extending aftwardly from the aft end of the forward section of the inboard liner at an angle in the range of from 180 degrees to 200 degrees; and
an outboard liner spaced radially outboard of and circumscribing the inboard liner, the outboard liner having a forward section and an aft section, the aft section of the outboard liner extending aftwardly from the aft end of the forward section of the outboard liner at an angle in the range of from 180 degrees to 200 degrees;
wherein, in longitudinal section, the forward section of the inboard liner converges toward the forward section of the outboard liner at an included interior angle in the range of from 70 degrees to 85 degrees, and the forward section of the outboard liner converges toward the forward section of the inboard liner at an included interior angle in the range of from 70 degrees to 85 degrees, the forward section of the inboard liner and the forward section of the outboard liner bounding a forward volume representing from about 30% to about 40% of the combustor volume.

18. A gas turbine engine combustor as recited in claim 17 further comprising:
a plurality of combustion air admission holes formed in the aft section of the inboard liner and arranged in a circumferentially extending row; and
a plurality of combustion air admission holes formed in the aft section of the outboard liner and arranged in a circumferentially extending row;
a forward portion of the aft section of the inboard liner and a forward portion of the aft section of the outboard liner bounding an intermediate volume representing from about 10% to about 20% of the combustor interior volume, and
an aft portion of the aft section of the inboard liner and an aft portion of the aft section of the outboard liner bounding an aft volume representing from about 40% to about 60% of the combustor interior volume, wherein the forward portions of the respective aft sections of the inboard and outboard liners lie upstream of the respective rows of combustion air admission holes in the inboard and outboard liners, and the aft portions of the respective aft sections of the inboard and outboard liners lie downstream of the respective rows of combustion air admission holes in the inboard and outboard liners.

19. A gas Turbine engine combustor as recited in claim 17 wherein, in longitudinal section, the forward section of the inboard liner converges toward the forward section of the outboard liner at an included interior angle in the range of from 74 degrees to 78 degrees, and the forward section of the outboard liner converges toward the forward section of the inboard liner at an included interior angle in the range of from 74 degrees to 78 degrees, the forward section of the inboard liner and the forward section of the outboard liner bounding a forward volume representing from about 35% of the combustor volume.

20. A gas turbine combustor as recited in claim 19 wherein:
the forward portion of the aft section of the inboard liner and the forward portion of the aft section of the outboard liner bounding an intermediate volume representing from about 20% of the combustor interior volume, and
the aft portion of the aft section of the inboard liner and the aft portion of the aft section of the outboard liner bounding an aft volume representing from about 45% of the combustor interior volume.

21. A gas turbine combustor having a combustor interior volume comprising;
an inboard liner extending longitudinally fore to aft, the inboard liner having a forward section and an aft section, the inboard liner including a plurality of combustion air admission holes formed in the aft section of the inboard liner and arranged in a circumferentially extending row;
an outboard liner space radially outboard of and circumscribing the inboard liner, the outboard liner spaced radially outboard of and circumscribing the inboard liner, the outboard liner having a forward section and an aft section, the outboard liner including a plurality of combustion air admission holes formed in the aft section of the outboard liner and arranged in a circumferentially extending row;
a bulkhead extending between a forward end of the inboard liner and a forward end of the outboard liner; and
a plurality of fuel injectors mounted in the bulkhead, the fuel injectors disposed in a circumferential array at equally spaced circumferential intervals, S, wherein a ratio S/D has a value in the range of at least 1.1 to not greater than 1.30, D being an annular depth in a radial direction along an annular boundary extending between the circumferential row of combustion air admission holes in the aft section of the inboard liner and the circumferential row of combustion air admission holes in the aft section of the outboard liner.

22. The gas turbine combustor as recited in claim 21 wherein the ratio S/D has a value in the range of 1.25 to 1.30.

23. The annular combustor as recited in claim 21 wherein the ratio S/H has a value in the range of at least 0.9 to less than 0.95, H being an annular height in a radial direction of the bulkhead extending between the forward end of the inboard inner and the forward end of the outboard liner.

* * * * *